(12) United States Patent
McBrady et al.

(10) Patent No.: US 6,279,725 B1
(45) Date of Patent: Aug. 28, 2001

(54) ADJUSTABLE ROTOR MACHINE

(75) Inventors: Garrett McBrady, Frankfort; Julian Avelis, Peotone, both of IL (US)

(73) Assignee: McBrady Engineering, Inc., Joliet, IL (US)

( * ) Notice: Subject to any disclaimer, the term of this patent is extended or adjusted under 35 U.S.C. 154(b) by 0 days.

(21) Appl. No.: 09/372,843

(22) Filed: Aug. 12, 1999

(51) Int. Cl.[7] .................................................. B65G 29/00
(52) U.S. Cl. ...................................... 198/473.1; 198/480.1
(58) Field of Search .......................... 198/347.3, 803.11, 198/470.1, 473.1, 478.1, 480.1

(56) References Cited

U.S. PATENT DOCUMENTS 3,957,154 * 5/1976 Shiba ............................ 198/473.1 X
5,082,105 * 1/1992 Tincati ......................... 198/480.4 X
5,586,642 * 12/1996 Hawkins ........................ 198/803.11

FOREIGN PATENT DOCUMENTS 1-220634 * 9/1989 (JP) ................................... 198/473.1
6-183551 * 7/1994 (JP) ................................... 198/478.1

* cited by examiner

Primary Examiner—James R. Bidwell
(74) Attorney, Agent, or Firm—Ernest Kettelson

(57) ABSTRACT

An adjustable rotor machine having a plurality of adjustable spoke assemblies radially spaced apart for holding bottles or other objects therebetween as the machine is rotated in a circular path, wherein the separation distance of the spoke assemblies can be varied to hold objects therebetween of different diameters. One spoke of each spoke assembly is rigidly affixed to the axle of the rotor. A second spoke of each spoke assembly is arcuately movable relative to the fixed spoke.

64 Claims, 9 Drawing Sheets

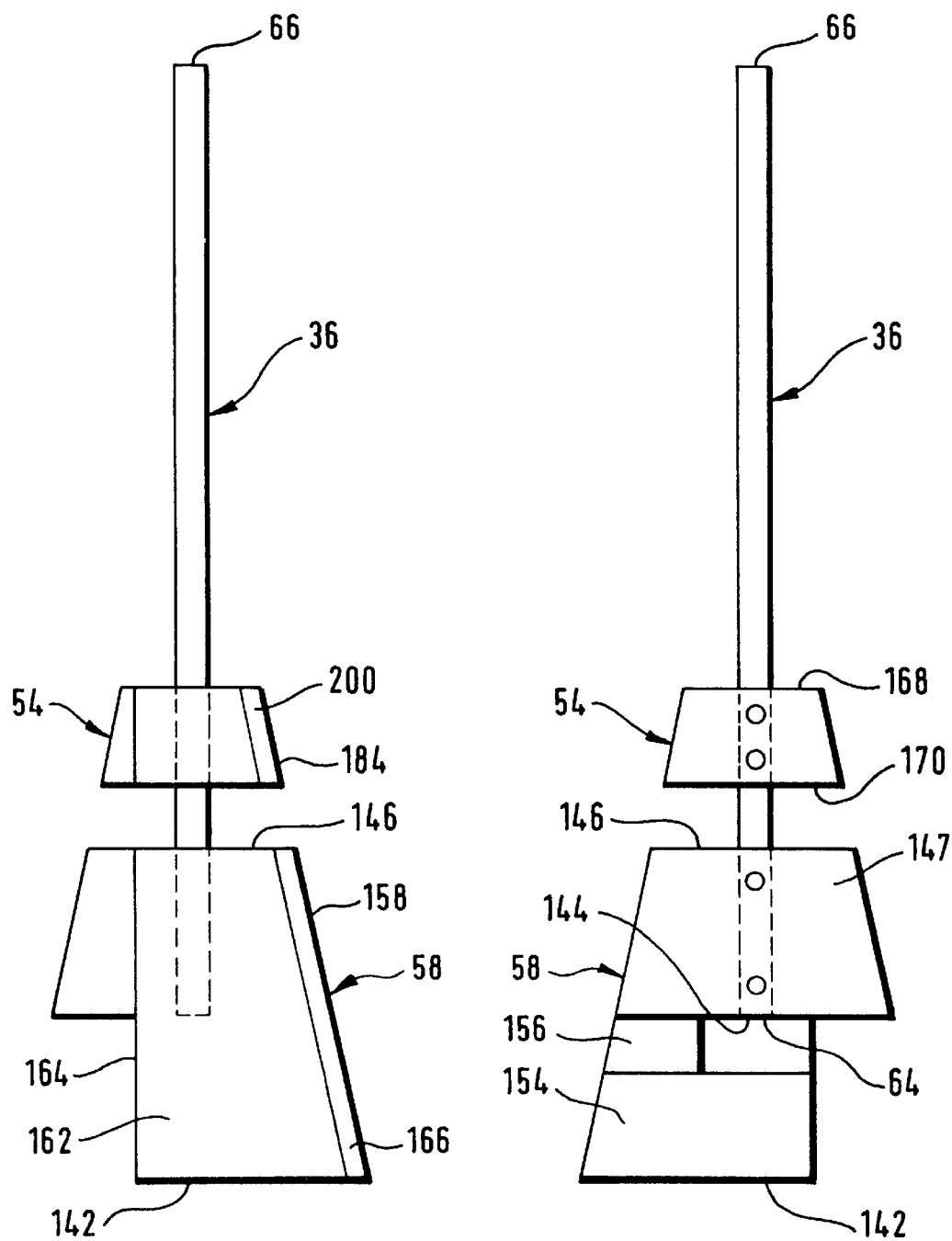

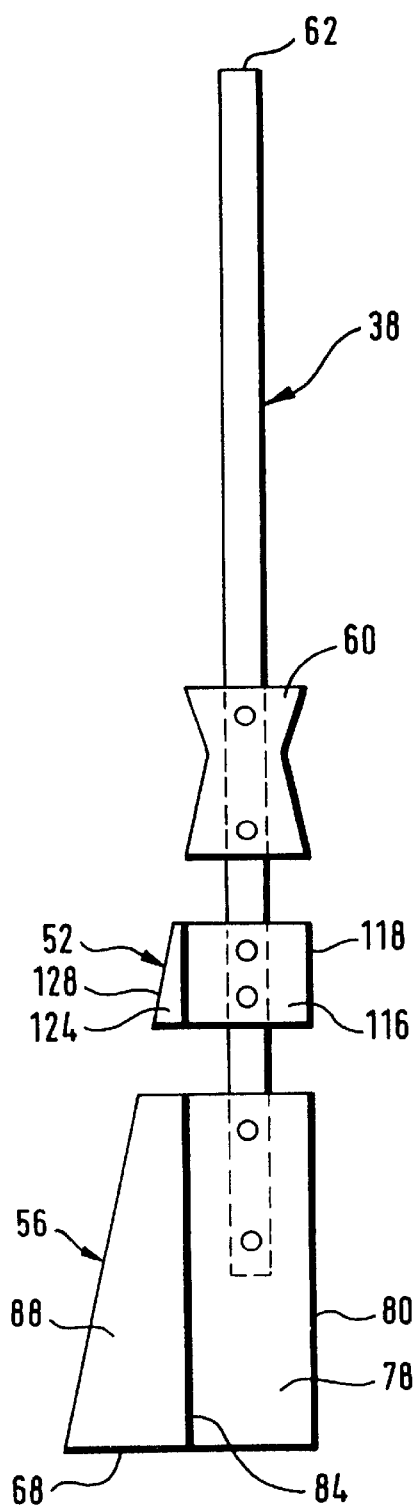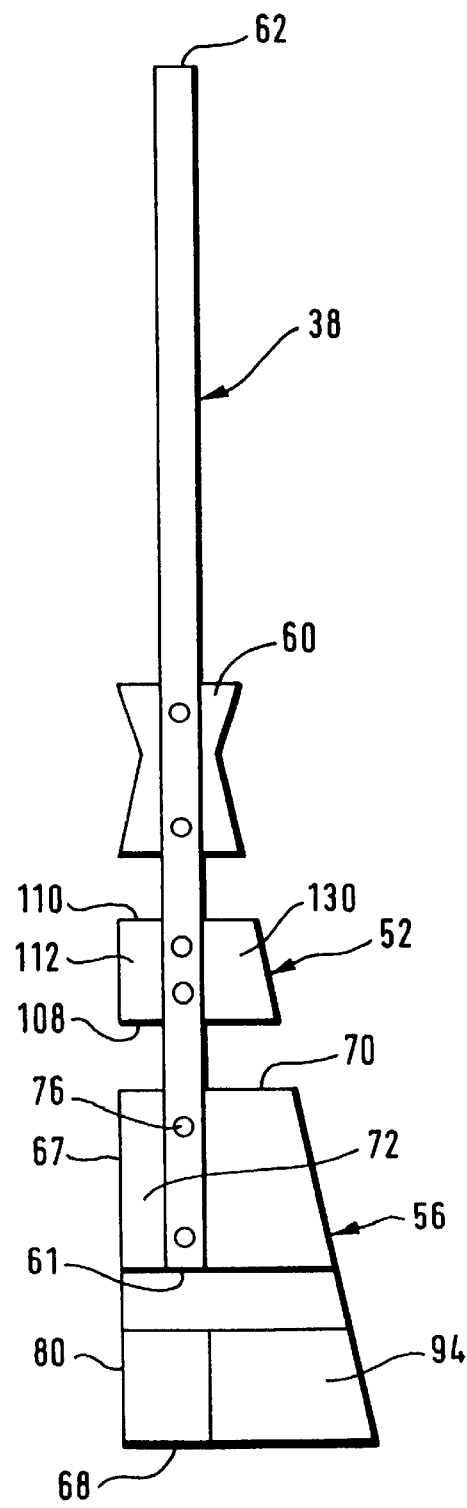

ADJUSTABLE ROTOR MACHINE

FIELD OF THE INVENTION

This invention relates to the field of rotor machines having a plurality of radially extending spokes or arms to hold objects such as bottles therebetween as the rotor assembly is rotated around a circular path to one or more processing stations, such as a washing station, a rinsing station, a filling station and so forth in the case of bottles and any other kind of processing operation in the case of other objects. The invention comprises a structure by which the separation distance between spoke assemblies can be adjusted to receive and hold bottles or other objects of different diameters or cross-sections therebetween. The separation distance can be increased for those having larger diameters and cross-sections and decreased for those having smaller diameters or cross-sections. The invention is particularly appropriate for use in bottle washing, rinsing and filling machines, but the invention disclosed and described herein can be used in any kind of rotor machine

BACKGROUND OF THE INVENTION

Prior art of which the inventor is aware includes a number of rotor type bottle washing machines, some of which have been assigned to the assignee of the invention disclosed herein, and a number of rotor type machines used for holding and carrying other types of products around a circular path to different locations where a variety of operations are performed on or in connection with such products. Such prior art of which the inventor in this case is aware include the following, none of which include the feature of being able to easily and quickly adjust the separation distance between respective spokes to receive and hold therebetween bottles or other objects of differing diameters or differeing cross-sectional dimensions.

U.S. Pat. No. 5,494,086 in which Garret McBrady and Julian Avelis are joint inventors discloses a bottle filling machine that comprises a vertical rotary spoke assembly having valve and delivery components which deliver pressurized air and/or rinse water to the bottles while in the upside down position through the upper portion of the vertical path of rotation and deliver whatever liquids the bottles are to be filled with while they are in the right-side-up position throughout the lower portion of the vertical rotational path.

U.S. Pat. No. 4,944,810 in which William J. McBrady is the inventor discloses a bottle washer machine in which bottles are washed, emptied and dried as they are rotated in a vertically positioned circular path.

U.S. Pat. No. 4,834,123 in which William J. McBrady is the inventor discloses a bottle washing machine similar to that disclosed in U.S. Pat. No. 4,944,810.

U.S. Pat. No. 3,159,164 in which Joseph K. McBrady is the inventor, discloses a container cleaning machine which is similar to those disclosed in U.S. Pat. Nos. 4,944,810 and 3,159,164.

U.S. Pat. No. 4,387,747 discloses a high speed rotary filling machine in which containers are rotated through a circular path during which they are filled from a filling head which rotates with the containers.

U.S. Pat. No. 3,659,634 discloses a device for filling individual receptacles with a metered quantity of a flowable material. The material is fed by gravity into containers below.

U.S. Pat. No. 2,908,124 discloses a machine for handling ampules and the like during the washing, drying, sterilizing, filling and sealing operations.

U.S. Pat. No. 1,218,315 discloses a machine for filling cylindrical oackages or cans with pulverulent material as they are carried around a curvilinear path.

U.S. Pat. No. 1,811,908 discloses a combined drainer and siruper for use in the canning industry and particularly for packing fruits and berries, which includes a totatable wheel having a plurality of turrets for holding the cans, and means to support the turrets in the plane of rotation during part of the revolution of the wheel and to move the turrets in a plane radial of the wheel and out of the plane of rotation during another part of the rotation.

U.S. Pat. No. 1,202,171 discloses a fruit can draining machine comprising a rotary spoke assembly, vertically movable arms pivoted thereto, a cap to support a can in place on each arm, and a cam assembly to turn the cans below the horizontal to drain kiquids therefrom.

U.S. Pat. No. 1,094,380 discloses a process for use in sterilizing milk bottles as they are carried on a conveyor line.

U.S. Pat. No. 955,551 discloses a bottling machine having a plurality of carriers to receive bottles for washing, filling, closing and labeling while in the carriers, and an intermittent drive mechanism to move the carriers from station to station with intervals of non-movement for processing.

U.S. Pat. No. 837,559 discloses a fruit washing machine to wash fruit after being placed in cans, comprising a tiltable carrier in which cans are clamped and guide members which invert the cans during travel after which they are moved back to an upright position.

U.S. Pat. No. 722,263 discloses an apparatus for bottling liquids, including a carrier rotatable in a vertical plane having transverse rows of bottle holders, the carrier being rotated beneath bottle filling tubes, and a lifting mechanism to raise and lower the tubes for inserting into and withdrawing from the bottles.

U.S. Pat. No. 522,396 discloses a machine for mixing gases with liquids such as carbonating beverages, comprising a bottle supporting frame rotated with a hollow rotating shaft in which gas is flowed under pressure, and a check valve mechanism connected to charge the liquid filled bottles with gas.

SUMMARY OF THE INVENTION

This invention provides a significant improvement over prior art rotor machines having radially spaced apart spokes to receive and hold bottles or other items therebetween as they are rotated around a circular path to the various stations where the different processing operations are performed. The prior art machines of that type can only be used with bottles or other products having a particular diameter or cross-sectional dimension without major changes that require removal of the existing spokes and other parts and replacing with new parts. It is an object and feature of the present invention to provide a rotor machine having a plurality of radially extending and arcuately spaced apart spoke assemblies in which the separation distance between the spoke assemblies can be easily increased or decreased to receive and hold therebetween bottles and other items of different diameters and cross-sections without removing any parts and without installing any new or different parts.

The separation distance between adjacent spoke assemblies can be readily increased or decreased by simply loosening four bolts that secure a circular plate in place to which adjustable spokes are connected. The adjustable spokes overlie fixed spokes that are connected to the axle of the rotor when the adjustable spokes are closest to the fixed spokes. At that time, the separation distance from the next adjacent adjustable spoke assembly is greatest for use with the largest diameter bottles or other items the rotor machine can receive.

When the bolts are loosened to permit rotation of the circular plate the distance permitted by arcuate slots in the plate through which the bolts extend, the circular plate and adjustable spokes connected thereto can then be rotated relative to the corresponding fixed spokes in each adjustable spoke assembly to arcuately move the adjustable spokes away from their respective fixed spokes. The farther the adjustable spokes are moved arcuately away from their corresponding fixed spokes, the smaller the separation distance between adjacent spoke assemblies to receive therebetween bottles or other items of smaller diameter or smaller cross-sectional dimension. To hold the adjustable spokes securely in whatever adjusted position desired, the four bolts through the arcuate slots of the circular plate are tightened to hold it and the adjustable spokes connected thereto in place.

In accordance with this invention, the adjustable spokes are arcuately movable or adjustable from their corresponding fixed spokes in the direction away from the direction of rotation of the rotor and spoke assemblies. This construction puts the fixed spokes which are rigidly affixed to the axle of the rotor, rather than the adjustable spokes held in their adjusted location by four bolts, in position to bear against the bottles or other items as they are pushed and carried around the circular path. Such construction, which puts the adjustable spokes on the side opposite the drive side of the spoke assemblies, eliminates the possibility that the adjustable spokes held in place by the four releasable bolts might be forced to slip out of the desired adjusted position as a result of an undue or unforeseen amount of pressure on the drive side of the spoke assemblies because of the weight of the bottles or other items being rotated, or for some other unforeseeable circumstance.

BRIEF DESCRIPTION OF THE DRAWING

FIG. 4 is a side elevation view of one of the adjustable spokes and its separation members which contact and bear against one side of the bottle or other object received between adjacent pairs of adjustable spoke assemblies in accordance with this invention.

FIG. 5 is a side elevation view of the adjustable spoke and separation members of FIG. 4 but showing the opposite side thereof.

FIG. 6 is a side elevation view of one of the fixed spokes and its separation members which contact and bear against one side of the bottle or other object received between adjacent pairs of adjustable spoke assemblies in accordance with this invention.

FIG. 7 is a side elevation view of the fixed spoke and separation members of FIG. 6 but showing the opposite side thereof.

DESCRIPTION OF PREFERRED EMBODIMENT

Figure 1:
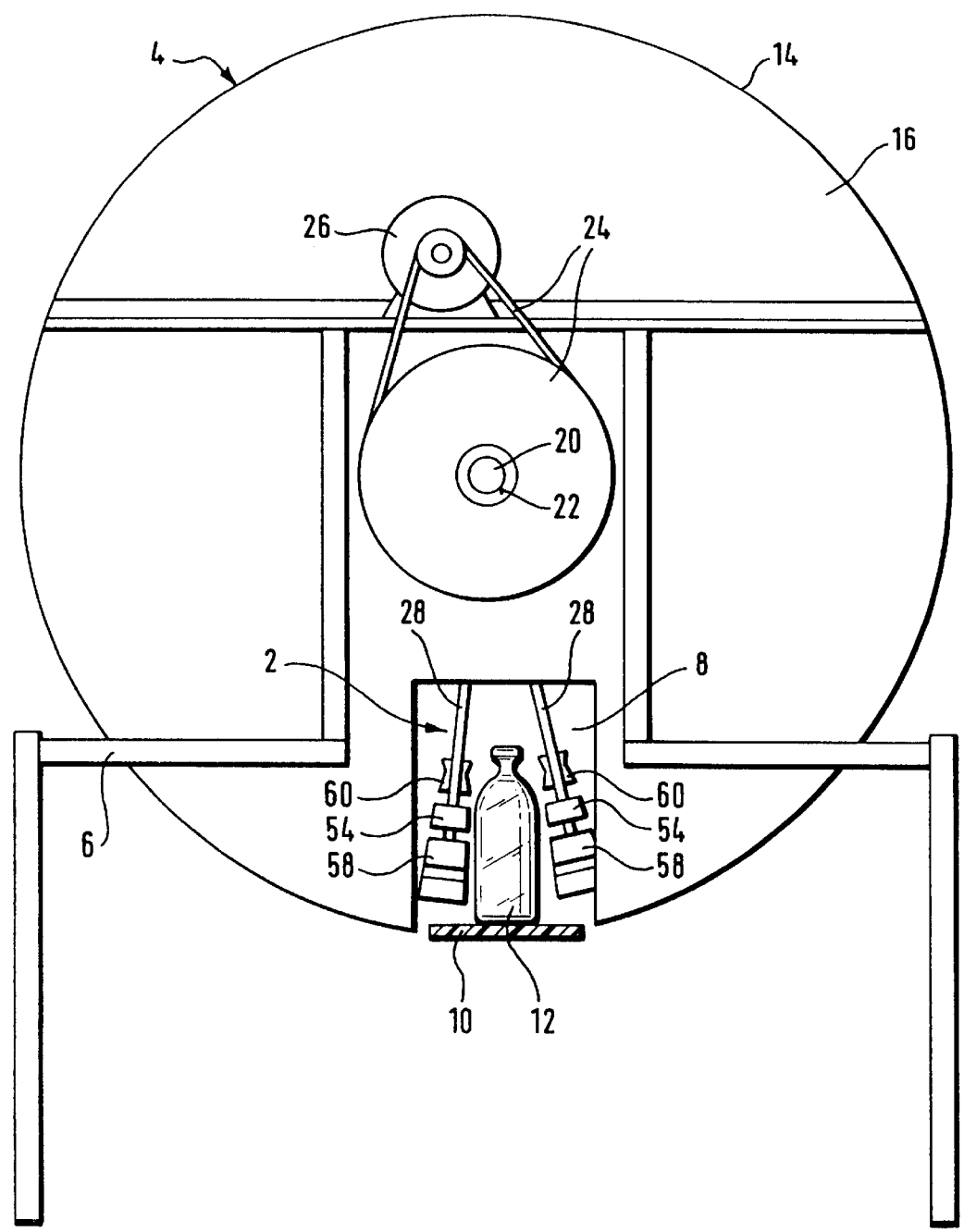
FIG. 1 is an elevation view of a bottle filling, washing and rinsing machine from the rear looking downstream of a coveyor line, in which the bottle filling, washing and rinsing machine has an adjustable rotor assembly in accordance with this invention.
Figure 2:
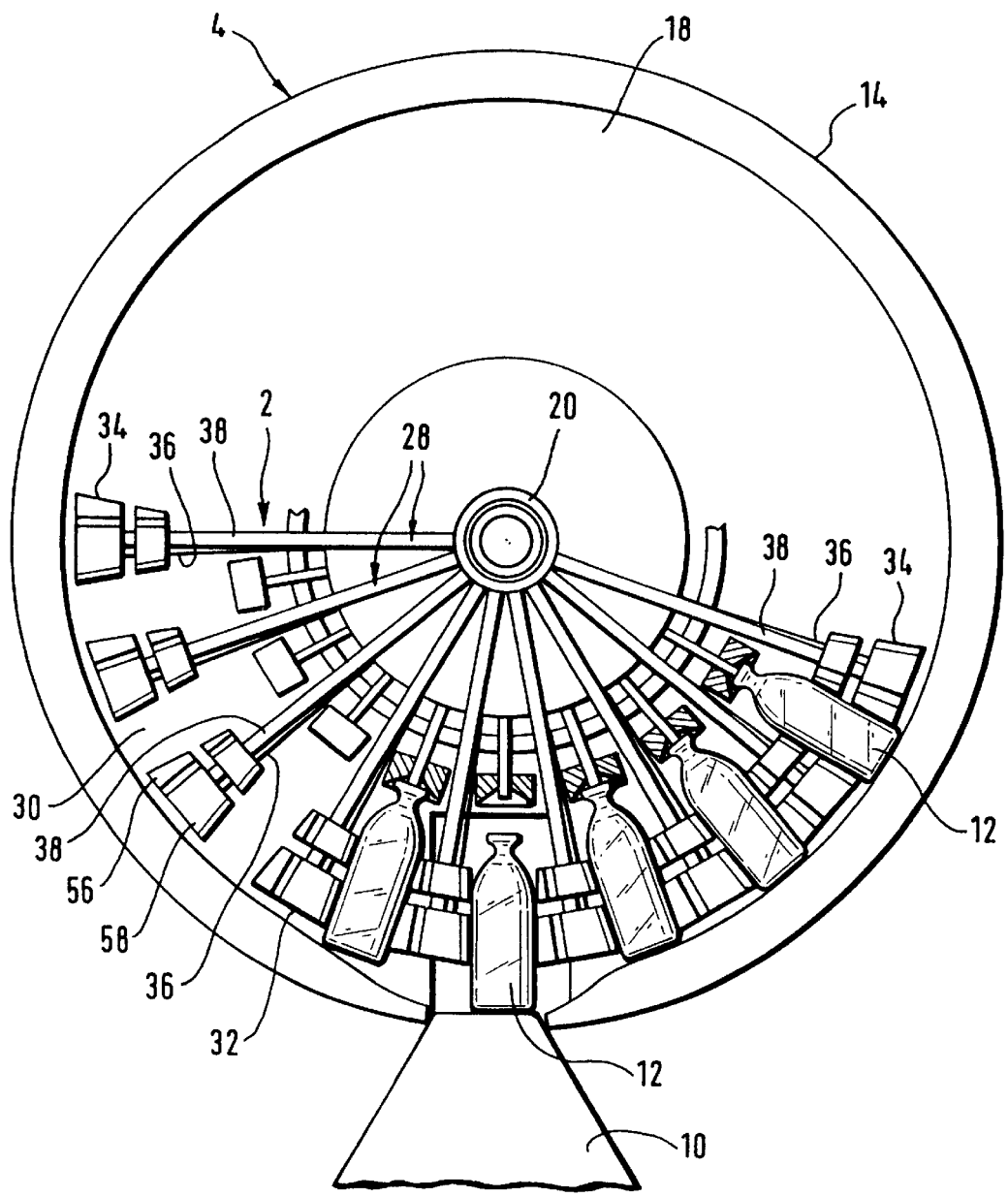
FIG. 2 is an elevation view from the front, looking upstream, of the bottle filling, washing and rinsing machine shown in FIG. 1, the rotor assembly rotating clockwise as seen in FIG. 2 looking upstream.
Figure 3:
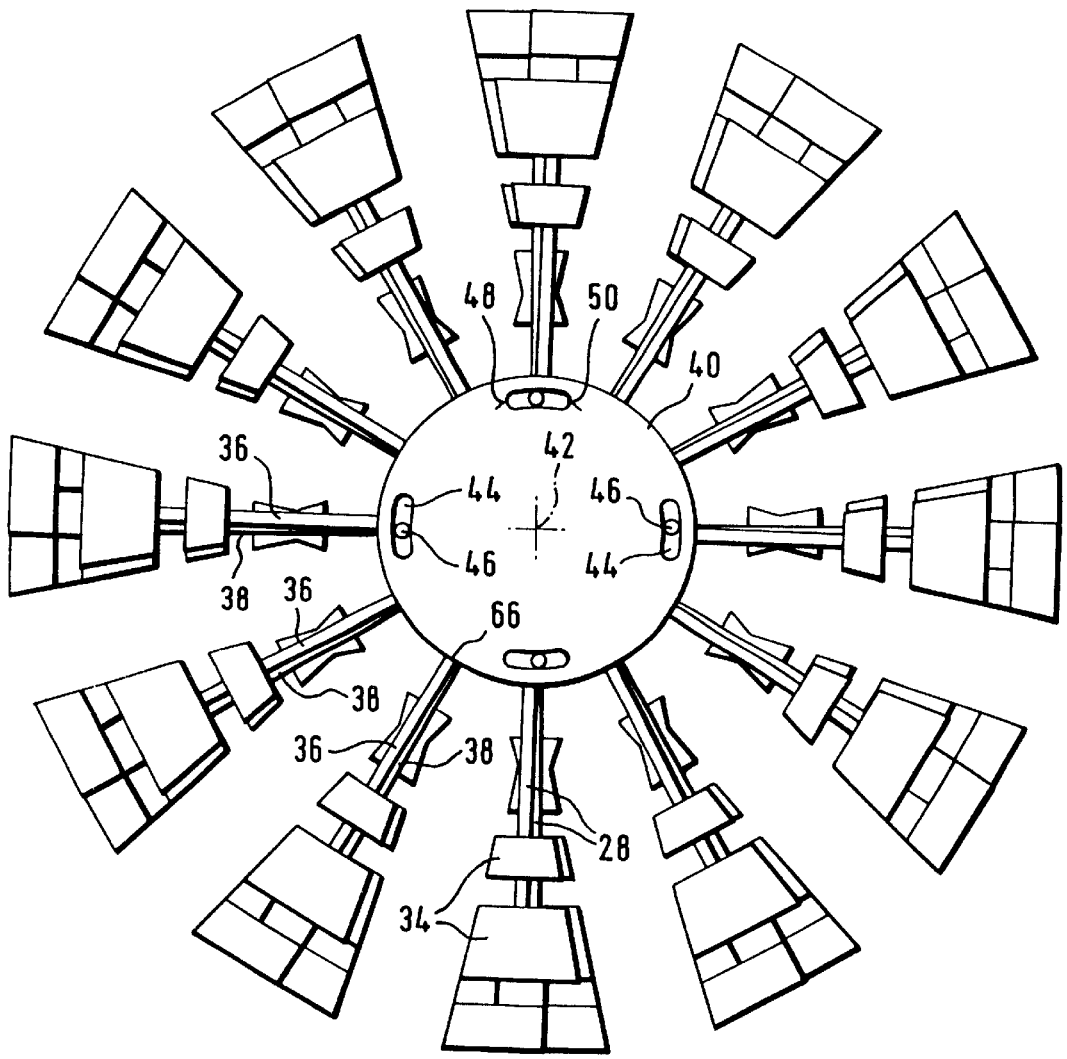
FIG. 3 is an elevation view of an adjustable rotor assembly in accordance with this invention, similar to the one shown in the bottle filling, washing and rinsing machine of FIG. 1 and FIG. 2.
Figure 8:
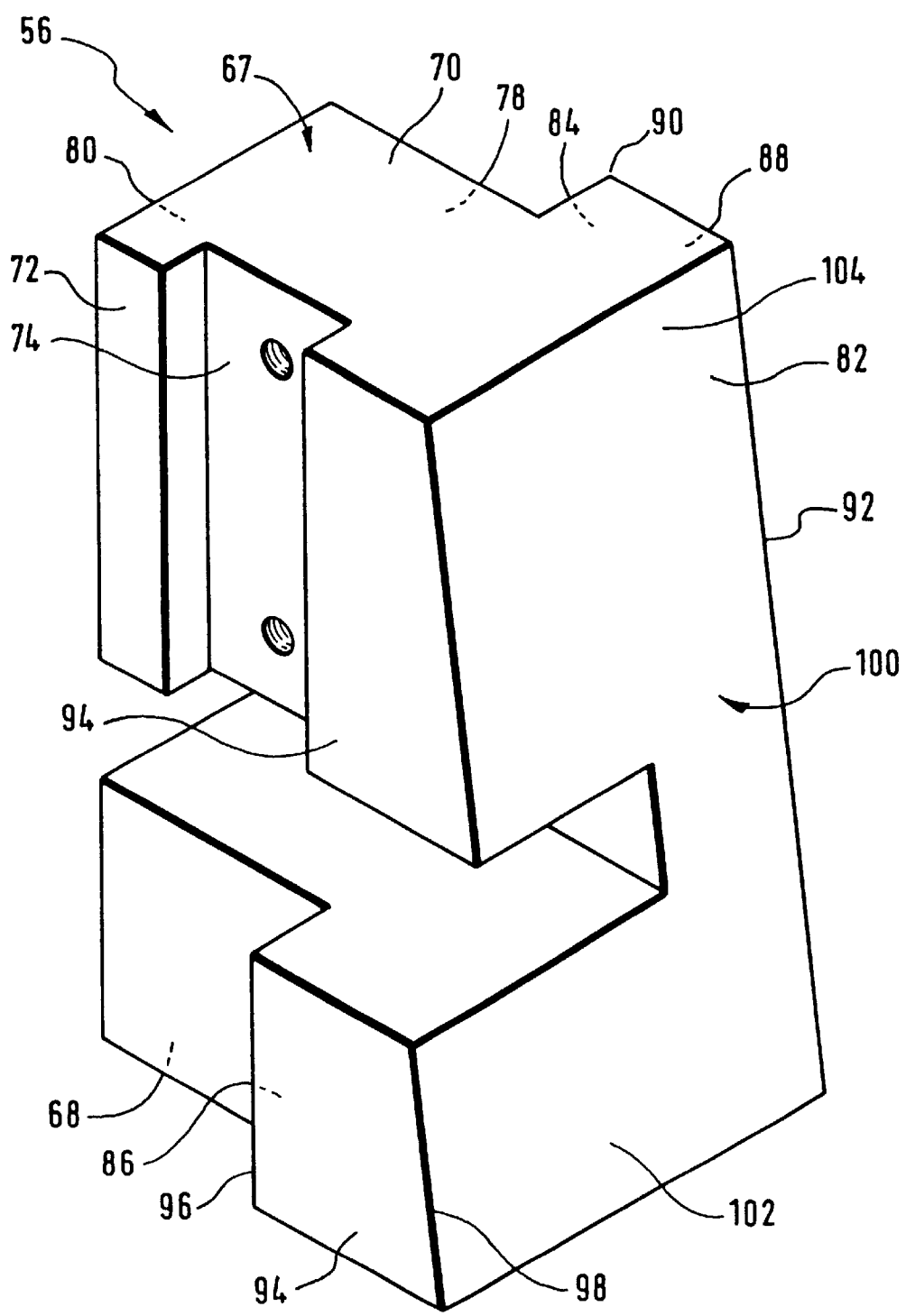
FIG. 8 is a perspective view of the lower separation member of the fixed spoke of the adjustable spoke assembly in accordance with this invention.
Figure 9:
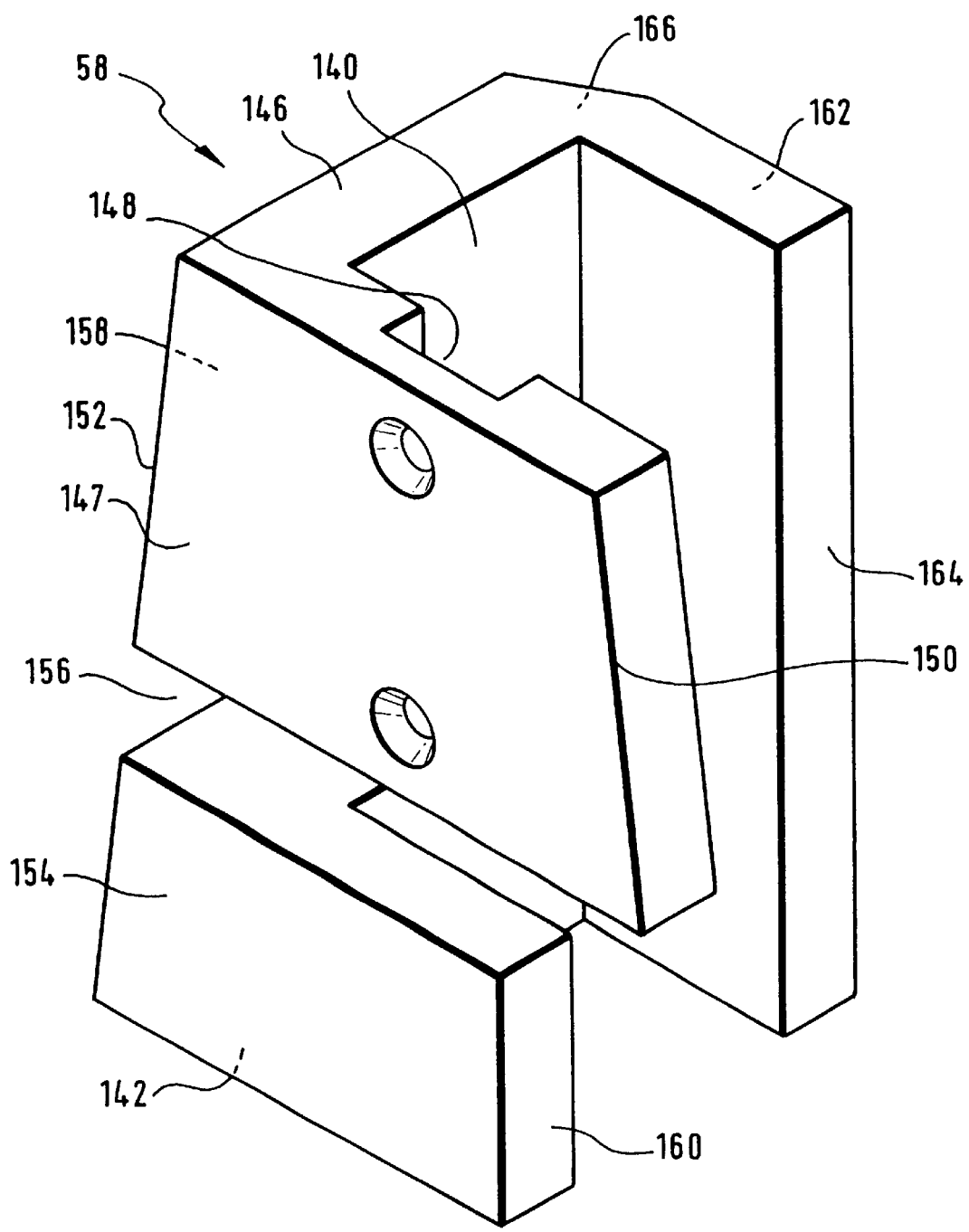
FIG. 9 is a perspective view of the lower separation member of the adjustable spoke of the adjustable spoke assembly in accordance with this invention.
Figure 10:
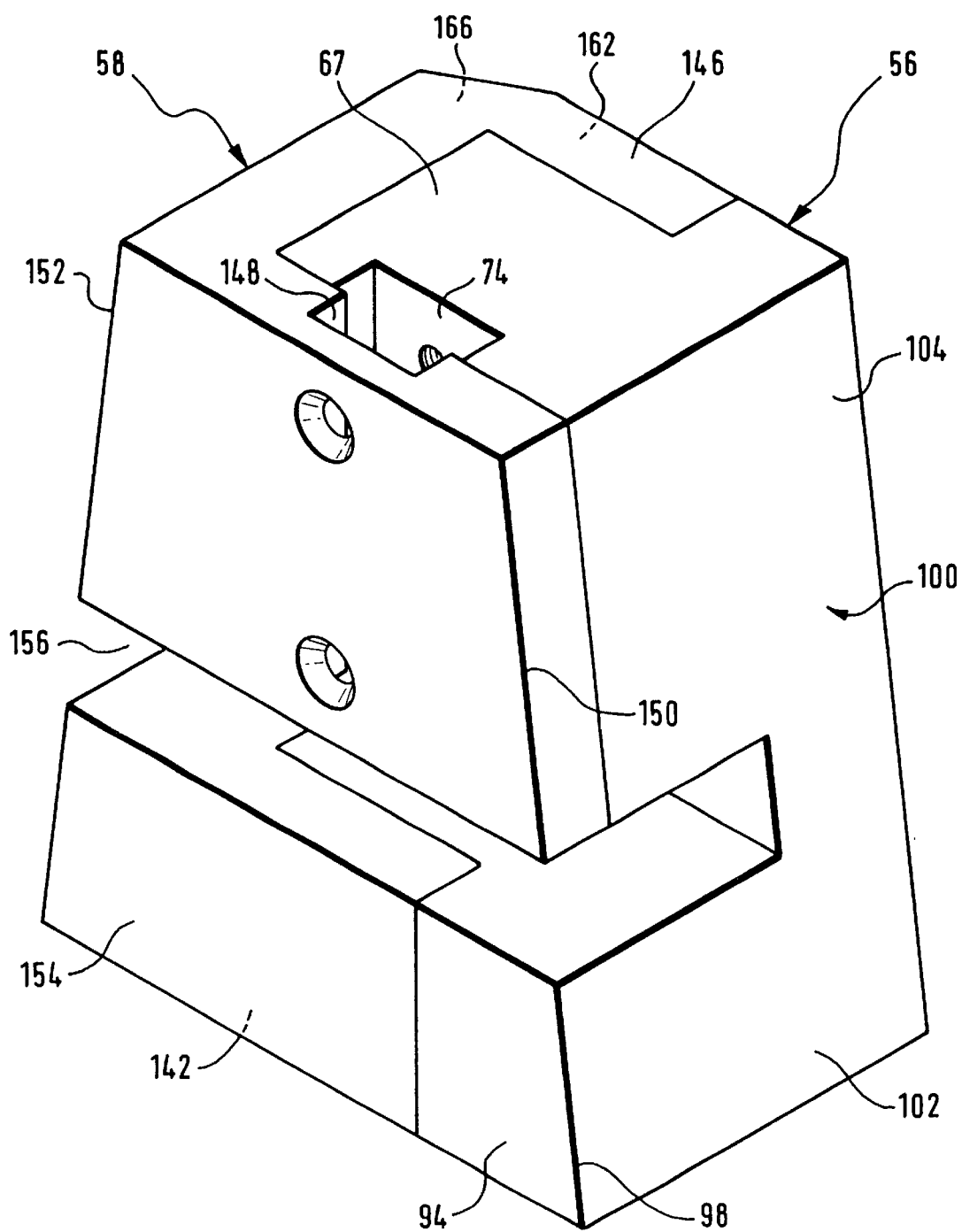
FIG. 10 is a perspective view showing the separation members of FIG. 8 and FIG. 9 when coupled together at which time the separation distance between adjacent pairs of adjustable spoke assemblies is at the maximum to receive the largest diameter bottles or other objects therebetween.
Figure 11:
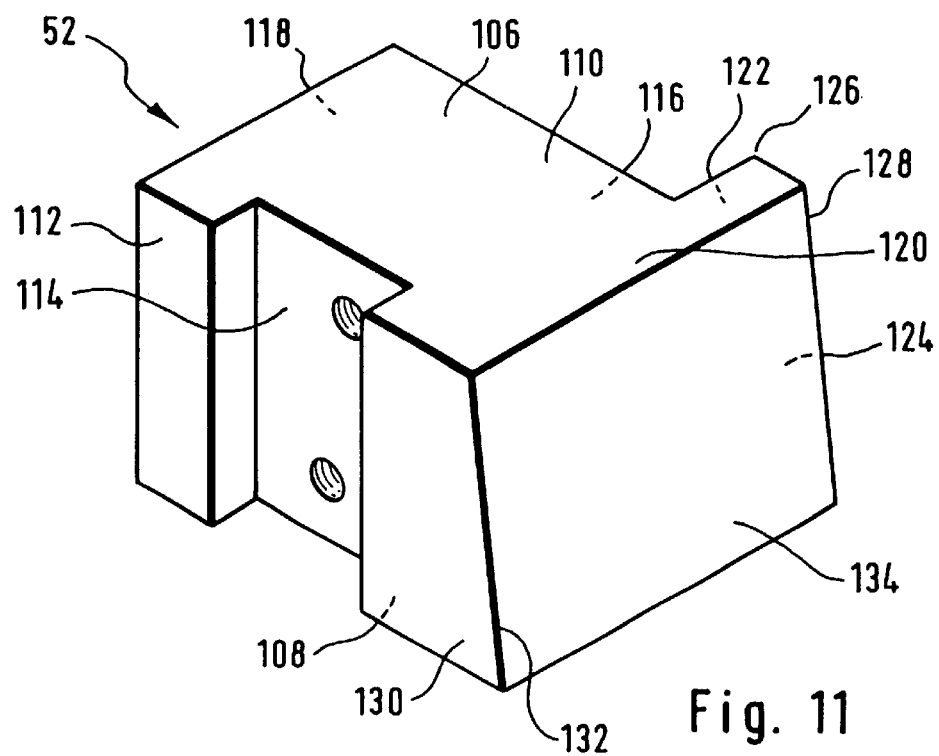
FIG. 11 is a perspective view of the upper separation member of the fixed spoke of the adjustable spoke assembly in accordance with this invention.
Figure 12:
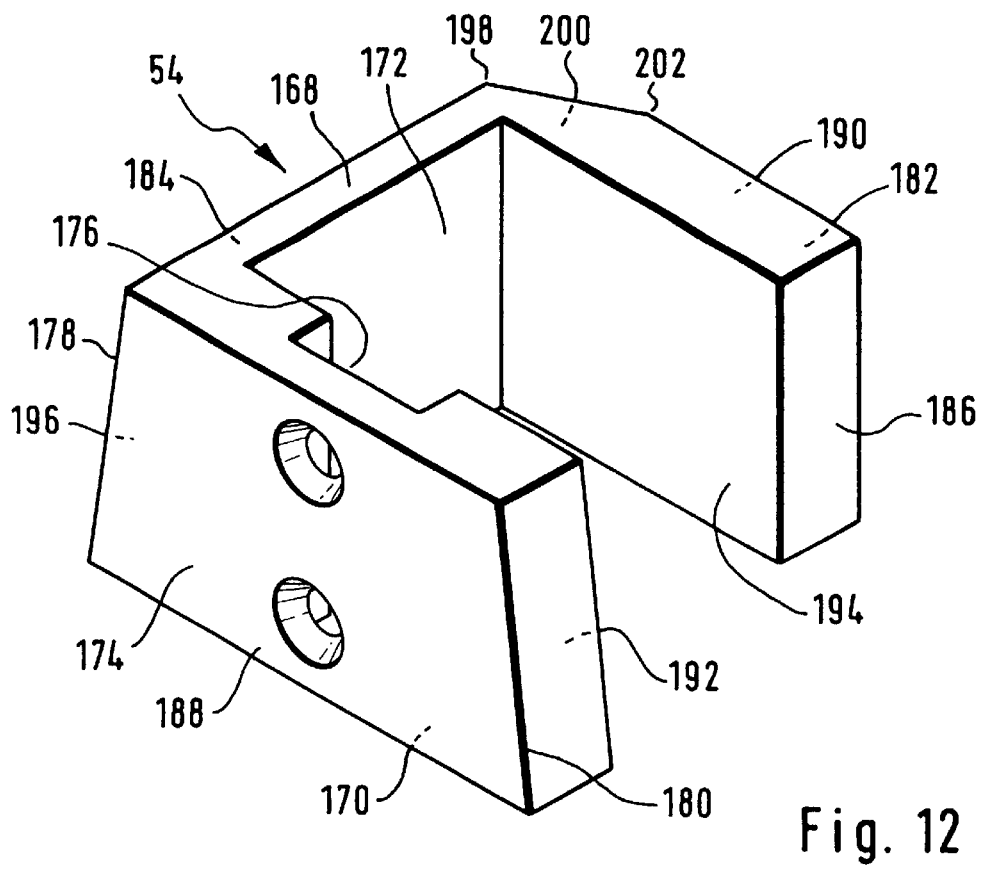
FIG. 12 is a perspective view of the upper separation member of the adjustable spoke of the adjustable spoke assembly in accordance with this invention.

A bottle washing and filling machine in accordance with the present invention comprises a rotating spoke assembly 2 mounted for rotation within a cylindrical drum 4 supported vertically by a frame 6.

A through passageway 8 is provided through the lower portion of the cylindrical drum 4 at the six o'clock position. A conveyor line 10 extends through the passageway 8 on which bottles 12 are conveyed to the rotating spoke assembly 2, rotated therearound to washing, rinsing, drying and filling positions, and then when filled conveyed away from the washing and filling machine to the next processing station, such as capping the bottles, applying labels and the like.

The cylindrical drum 4 comprises a large diameter cylindrical side wall 14 extending in a circular path vertically from each side of the through passageway at the lower or six o'clock position, a rear wall 16 facing in the upstream direction of the conveyor line 10, and an open front wall 18 facing in the downstream direction of the conveyor line 10. The rotating spoke assembly 2 comprises an axle 20 which extends through a central aperture 22 of the rear wall 16 of the drum 4, connected by a drive assembly 24 on the upstream side of the rear wall 16 to an electric motor 26 for rotation thereof. A plurality of adjustable spoke assemblies 28 extend radially from the axle 20 on the downstream side of the rear wall 16 of the drum 4, within the operating cavity 30 of the drum 4 bounded by its rear wall 16 and cylindrical side wall 14. The adjustable spoke assemblies 28 terminate in outer free ends 32 at a pre-determined short distance radially inwardly from the cylindrical side wall 14.

Adjustable separator pad assemblies 34 of somewhat resilient shock absorbing material are secured to the outer end region of the spoke assemblies 28, extending inwardly of the free ends 32 a distance that will place the separator pad assemblies 34 for contact with bottles 12 as they are carried on the conveyor line 10 into the rotational path of the vertically mounted rotating spoke assembly 2 between an adjacent pair of spoke assemblies 28 and their respective spearator pad assemblies 34.

When viewing the vertical drum 4 and rotational spoke assembly 2 from the downstream side and looking in the upstream direction through the open front wall 18 of the drum 4, the spoke assembly 2 is seen to rotate in the clockwise direction.

The adjustable spoke assemblies 28 each comprise an arcuately adjustable spoke 36 which is arcuately movable toward and away from a fixed spoke 38. The fixed spoke 38 is secured to the axle 20 and is not movable or adjustable relative to the axle. The fixed spoke 38 rotates around and within the cylindrical drum 4 with the axle 4. The adjustable spoke 36 is secured to a circular plate 40 which is arcuately movable relative to the fixed spokes 38 of each spoke assembly 28 to thereby arcuately move and thus adjust the adjustable spokes 36 of each spoke assembly 28 relative to the corresponding fixed spoke 38 of each spoke assembly 28.

The circular plate 40 is mounted with its central axis 42 coaxial with that of the axle 20 of the rotating spoke assembly 2. The circular plate 40 includes arcuate slots 44 which are slightly elongated. Mounting bolts 46 extend through the arcuate slots 44 and are threaded into correspondingly threaded apertures in the respective facing portions of the fixed spokes 38. When the bolts 46 are loosened, the circular plate 40 can be rotated slightly relative to the fixed spokes 38 from one end 48 of the arcuate slots to the opposite end 50 thereof, thus arcuately moving the adjustable spokes 36, which are secured to the plate 40, relative to the fixed spokes 38. The adjustable spokes 36 are arcuately movable and thus adjustable relative to their respective fixed spokes 38 in each spoke assembly 28 between a maximum separation distance from the next adjacent spoke assembly 28 wherein the adjustable spoke 36 of each spoke assembly 28 overlays its corresponding fixed spoke 38 with no arcuate separation between them at all, and a minimum separation distance from the next adjacent spoke assembly 28 wherein the adjustable spoke 36 of each spoke assembly 28 is separated the maximum arcuate distance from its corresponding fixed spoke 38 permitted by rotation of the circular plate 40 until the end 48 of each arcuate slot 44 contacts and bears against the respective mounting bolt 46 extending therethrough. The farther the adjustable spoke 36 is moved or spread apart from its corresponding fixed spoke 38, the less the separation distance between adjacent adjustable spoke assemblies 28 for use with smaller diameter bottles. The closer the adjustable spoke 36 is moved toward its corresponding fixed spoke 38, the greater the separation distance between adjacent adjustable spoke assemblies 28 for use with larger diameter bottles.

When the adjustable spokes are in their maximum separation distance from the next adjacent spoke assembly 28, overlaying their respective fixed spokes 38, the circular plate 40 has been rotated until the opposite ends 50 of each arcuate slot 44 contact and bear against the respective mounting bolts 46 extending therethrough.

Each fixed spoke 38 has a fixed upper separator member 52 affixed thereto in position to matably receive a corresponding adjustable upper separator member 54 affixed to the corresponding adjustable spoke 36 of each spoke assembly 28.

Each fixed spoke 38 has a fixed lower separator member 56 affixed thereto in position to matably receive a corresponding adjustable lower separator member 58 affixed to the corresponding adjustable spoke 36 of each spoke assembly 28.

A neck guide member 60 is affixed to the fixed spoke 38 of each spoke assembly 28 to guide the bottles 12 into position between respective ones of the spoke assemblies 28.

The separator members 52, 54, 56 and 58 comprise a block of relatively durable material which is still resilient enough to have shock absorbent characteristics. A preferred material is UHMW (ultra high molecular weight) polyethylene.

In the preferred embodiment of the invention described herein, the fixed spoke 38 has a length of about twenty two inches from its lower end 61 to its upper end 62. The adjustable spoke 36 has a length of about eighteen inches from its lower end 64 to its upper end 66. The upper end 62 of the fixed spoke 38 is connected to the axle 20. The upper end of the adjustable spoke 36 is connected to the outer annular edge of the circular plate 40.

The fixed lower separator member 56 is affixed to the lower portion of the fixed spoke 38 and has an insert portion 67 having a bottom end wall 68 that extends below the lower end 60 of the fixed spoke 38 about two and a quarter inches. The insert portion 67 of the fixed lower separator member 56 has an upper end wall 70 spaced apart upwardly from the bottom end wall 68 thereof about four and three-fourths inches. It has a first side wall 72 facing in the direction toward the fixed spoke 38 having a rectangular groove 74 cut therein to receive the lower portion of the fixed spoke 38. Bolts 76 extend through the insert portion 67 of the fixed lower separator member 56 from its second side wall 78 opposite from the first side wall 72, through the groove 74, and through the lower portion of the fixed spoke 38 received in the groove, to thereby secure the lower separator member 56 to the fixed spoke 38.

A third side wall 80 of the insert portion 67 of the fixed lower separator member 56 faces in the direction toward which the adjustable spoke 36 is arcuately movable or arcuately adjustable relative to the fixed spoke 38. It has a length of about four and three-quarters inches from the bottom end wall 68 to the upper end wall 70, and a width of about an inch and a quarter.

The fixed lower separator member 56 has an integrally formed bottle contact portion 82 extending from the insert portion 67 in the direction away from that in which the adjustable spoke 36 is arcuate movable or arcuately adjustable relative to the fixed spoke 38. The bottle contact portion 82 includes a first abutment wall 84 extending outwardly from and normal to the second side wall 78 of the insert portion 67 of the fixed lower separator member 56 about three-eighths of an inch and a second abutment wall 86. The first abutment wall 84 extends from the bottom end wall 68 of the insert portion 67 of the fixed lower separator member 56 in the direction toward the upper end wall 70 thereof about four and three-quarters inches.

The bottle contact portion 82 includes a first trapezoidal side wall 88 extending from the outer edge 90 of the first abutment wall 84 in the direction away from that in which the adjustable spoke 36 is arcuate movable or arcuately adjustable relative to the fixed spoke 38 and it extends normal to the first abutment wall 84. The outer edge 90 of the first abutment wall 84 extends substantially parallel to the fixed spoke 38. The first trapezoidal side wall 88 terminates opposite from the outer edge 90 of the first abutment wall 84 in a diagonally extending edge 92. The first trapezoidal side wall has a length of about four and three-quarters inches along the outer edge 90 of the first abutment wall 84, and a length of about four and nine-sixteenths inches along the opposite diagonally extending edge 92.

A second trapezoidal side wall 94 of the bottle contact portion 82 of the fixed lower separator member 56 extends from the outer edge 96 of the second abutment wall 86 in the direction away from that in which the adjustable spoke 36 is arcuate movable or arcuately adjustable relative to the fixed spoke 38 and it extends normal to the second abutment wall 86. The outer edge 96 of the second abutment wall 86 extends substantially parallel to the fixed spoke 38. The second trapezoidal side wall 94 terminates opposite from the outer edge 96 of the second abutment wall 86 in a diagonally extending edge 98. The second trapezoidal side wall 94 has a length of about one and a half inches along the outer edge 96 of the second abutment wall 86, and a length just slightly greater along the opposite diagonally extending edge 98.

The bottle contact portion 82 of the fixed lower separator member 56 includes a diagonally extending bottle contact side wall 100 extending from the outer edge 92 of the first trapezoidal side wall 88 and laterally in a direction normal to the first and second trapezoidal side walls and between the first and second trapezoidal side walls. The bottle contact side wall 100 includes a lower portion 102 which extends laterally to the diagonally extending edge 98 of the second trapezoidal side wall 94, and an upper portion 104 which extends laterally about one and five-eighths inches from the outer edge 92 of the first trapezoidal side wall 88.

The fixed upper separator member 52 is affixed to the fixed spoke 38 at a location spaced apart from the fixed lower separator member 56 about an inch thereabove. The fixed upper separator member 52 has an insert portion 106 having a bottom end wall 108 about an inch above the upper end wall 70 of the insert portion 67 of the fixed lower separator member 56. The insert portion 106 of the fixed lower separator member 52 has an upper end wall 110 spaced apart upwardly from the bottom end wall 108 thereof about two and a half inches. It has a first side wall 112 facing in the direction toward the fixed spoke 38 having a rectangular groove 114 cut therein to receive the facing portion of the fixed spoke 38. Bolts 76 extend through the insert portion 106 of the fixed upper separator member 52 from its second side wall 116 opposite from the first side wall 112, through the groove 114, and through the facing portion of the fixed spoke 38 received in the groove, to thereby secure the fixed upper separator member 52 to the fixed spoke 38.

A third side wall 118 of the insert portion 106 of the fixed upper separator member 52 faces in the direction toward which the adjustable spoke 36 is arcuately movable or arcuately adjustable relative to the fixed spoke 38. The third side wall 118 has a length of about two and a half inches from the bottom end wall 108 to the upper end wall 110, and a width of about an inch and three-quarters.

The fixed upper separator member 52 has an integrally formed bottle contact portion 120 extending from the insert portion 106 in the direction away from that in which the adjustable spoke 36 is arcuately movable or arcuately adjustable relative to the fixed spoke 38. The bottle contact portion 120 includes a first abutment wall 122 extending outwardly from and normal to the second side wall 116 of the insert portion 106 of the fixed upper separator member 52 about one-half inch. The first abutment wall 122 extends from the bottom end wall 108 of the insert portion 106 of the fixed upper separator member 52 in the direction toward the upper end wall 110 thereof about two and a half inches.

The bottle contact portion 120 of the fixed upper separator member 52 includes a trapezoidal side wall 124 extending from the outer edge 126 of the first abutment wall 122 in the direction away from that in which the adjustable spoke 36 is arcuately movable or arcuately adjustable relative to the fixed spoke 38 and it extends normal to the abutment wall 122 of the fixed upper separator member 52. The outer edge 126 of the abutment wall 122 of the fixed upper separator member 52 extends substantially parallel to the fixed spoke 38. The trapezoidal side wall 124 of the fixed upper separator member 52 terminates opposite from the outer edge 126 of the abutment wall 122 in a diagonally extending edge 128. The trapezoidal side wall 124 has a length of about two and a half inches along the outer edge 126 of the abutment wall 122, and a length slightly greater than two and a half inches along the opposite diagonally extending edge 128.

A second trapezoidal side wall 130 of the bottle contact portion 120 of the fixed upper separator member 52 extends from the groove 114 cut in first side wall 112 of the insert portion of the fixed upper separator member 52 in the direction away from that in which the adjustable spoke 36 is arcuate movable or arcuately adjustable relative to the fixed spoke 38. The second trapezoidal side wall 130 terminates in a diagonally extending edge 132. The second trapezoidal side wall 130 has a length of about two and a half inches along its diagonally extending edge 132.

The bottle contact portion 120 of the fixed upper separator member 52 includes a diagonally extending bottle contact side wall 134 extending from the outer edge 128 of the trapezoidal side wall 124 of the fixed upper separator member 52 to the diagonally extending edge 136 of the first side wall 112 thereof.

The adjustable lower separator member 58 is affixed to the lower portion of the adjustable spoke 36 and has a cavity 140 to receive the insert portion 67 of the fixed lower separator member 56 when the adjustable spoke 36 is arcuately moved into its maximum separation distance from the next adjacent spoke assembly 28. In such position the adjustable spoke 36 overlays the fixed spoke 38 of each spoke assembly 28.

The adjustable lower separator member 58 is affixed to the lower portion of the adjustable spoke 36 and has a lower end wall 142 that extends below the lower end 144 of the adjustable spoke 36 about two and a quarter inches. The adjustable lower separator member 58 has an upper end wall 146 spaced apart upwardly from the lower end wall 142 thereof about four and three-fourths inches. It has a first side wall 147 with an inner surface facing the cavity 140 and a rectangular groove 148 cut therein to receive the facing portion of the adjustable spoke 36. Bolts 76 extend through the side wall 147 of the adjustable lower separator member 58, through the groove 148, and through the facing portion of the adjustable spoke 36 received in the groove, to thereby secure the adjustable lower separator member 58 to the adjustable spoke 36. The side wall 147 has converging opposite side edges 150 and 152, which slightly converge as they extend upwardly from the lower end wall 142 toward the upper end wall 146.

A second side wall 154 of the adjustable lower separator member 58 is spaced apart below the first side wall 146 by a gap 156 of about three-quarters inch. This second side wall 154 extends from the diagonally extending bottle contact wall 158 of the adjustable lower separator member 58 in the direction toward the fixed lower separator member 56 about two and a half inches to terminate in an abutment edge 160. This abutment edge 160 of the side wall 154 of the adjustable lower separator member 58 abuts against the second abutment wall 86 of the bottle contact portion of the fixed lower separator member 56 on the fixed spoke 38 when the insert portion 67 thereof has been fully received in the cavity 140 of the adjustable lower separator member 58.

The adjustable lower separator member 58 includes a third side wall 162 on the opposite side of the cavity 140 from the first side wall 147 and its spaced apart second side wall 154. The third side wall 162 extends from the diagonally extending bottle contact wall 158 of the adjustable lower separator member 58 in the direction toward the fixed lower separator member 56 on the fixed spoke 38 to terminate in an elongated abutment edge 164. The elongated abutment edge 164 of the third side wall 162 of the adjustable lower separator member 58 abuts against the first abutment wall 84 of the bottle contact portion 82 of the fixed lower separator member 56 when the insert portion 67 thereof has been fully received in the cavity 140 of the adjustable lower separator member 58.

A diagonally extending side wall 166 of the adjustable lower separator member 58 extends between the third side wall 162 and the bottle contact wall 158 thereof.

The adjustable upper separator member 54 is affixed to the adjustable spoke 36 at a location spaced apart from the adjustable lower separator member 58 about an inch thereabove. The adjustable upper separator member 54 has an upper end wall 168 spaced apart upwardly from the lower end wall 170 thereof about two and a half inches. The adjustable upper separator member 54 has a cavity 172 to receive the insert portion 106 of the fixed upper separator member 52. It has a first side wall 174 with an inner surface facing the cavity 172 and a rectangular groove 176 cut therein to receive the facing portion of the adjustable spoke 36. Bolts 76 extend through the side wall 174 of the adjustable upper separator member 54, through the groove 176, and through the facing portion of the adjustable spoke 36 received in the groove, to thereby secure the adjustable upper separator member 54 to the adjustable spoke 36. The side wall 174 of the adjustable upper separator member 54 has converging opposite side edges 178 and 180, which slightly converge as they extend upwardly from the lower end wall 170 toward the upper end wall 168.

The adjustable upper separator member 54 includes a second side wall 182 on the opposite side of the cavity 172 from the first side wall 174. The second side wall 182 of the adjustable upper separator member 54 extends from the diagonally extending bottle contact wall 184 of the adjustable upper separator member 54 in the direction toward the fixed upper separator member 52 on the fixed spoke 38 to terminate in an elongated abutment edge 186. The elongated abutment edge 186 of the second side wall 182 of the adjustable upper separator member 54 abuts against the abutment wall 122 of the bottle contact portion 120 of the fixed upper separator member 52 when the insert portion 106 thereof has been fully received in the cavity 172 of the adjustable upper separator member 54.

The outer surface 188 of the first side wall 174 of the adjustable upper separator member 54 is spaced apart from the outer surface 190 of the second side wall 182 thereof a distance of about three inches. The inner surface 192 of the first side wall 174 of the adjustable upper separator member 54 is spaced apart from the inner surface 194 of the second side wall 182 thereof a distance of about one and three-fourths inches.

The bottle contact wall 184 of the adjustable upper separator member 54 has a lateral dimension between its side edges 196 and 198 of about two and a half inches. A diagonally extending side wall 200 of the adjustable upper separator member 54 extends at a diagonal between the side edge 202 of the second side wall 182 thereof and the side edge 198 of the said bottle contact wall 184.

In accordance with this invention, the distance between adjacent spoke assemblies 28 can be adjusted to receive bottles of different diameters or cross sectional dimensions therebetween. The same machine with the same rotating spoke assembly 2 can thus be used for a number of different size bottles. To adjust the separation of adjacent spoke assemblies 28 between the minimum and maximum degrees of separation, the four mounting bolts 46 which secure the circular plate 40 to the fixed spokes 38 are loosened. The circular plate 40 may then be rotated through a short arcuate path between the opposite ends 48 and 50 of each arcuate slot 44. When the respective bolts 46 reach and bear against the end 48 of each arcuate slot 44, the adjustable spoke 36 has been arcuately moved as far from its corresponding fixed spoke 38 as possible. At such time, the separation distance between adjacent adjustable spoke assemblies 28 is the smallest for use with bottles of smalles diameters or smaller cross-sectional dimensions.

When the circular plate 40 is rotated in the opposite direction until the bolts 46 reach and bear against the end 50 of each arcuate slot 44, the adjustable spoke 36 has been arcuately moved as close to its corresponding fixed spoke 38 as possible. At such point, the spokes 36 and 38 overlay each other, and the insert portions of the separation members on the fixed spokes 38 are at such time received in the corresponding cavities of the separation members on the adjustable spokes 36. The separation distance between adjacent spoke assemblies 28 is then at the maximum for use with bottles of larger diameter or cross-sectional dimensions.

When the adjustable spokes 36 have been adjusted to the desired position that will enable the bottle contact walls of the separator members to contact and bear against the walls of the bottles to be washed, rinsed and or filled, the four bolts 46 are then tightened to secure the circular plate 40 and the adjustable spokes 36 extending from its outer circular edge in that desired position. The adjustable rotor machine in accordance with this invention is then ready for use.

It is an important feature and construction of this adjustable rotor machine invention that the fixed spokes 38 and the separator members fixed thereon are the ones that have driving engagement against the bottles 12 as they are rotated and carried around the rotational path of the rotating spoke assembly. That way, no undue stress is applied to the adjustable spokes 36 and the separator members fixed thereto, nor to the bolts 46 which when tightened hold the circular plate 40 and adjustable spokes 36 extending therefrom in the desired adjusted position. In other words, there is no driving stress or driving pressure on the adjustable spokes 36 to cause them to slip out of the desired adjusted position. Since the fixed spokes 38 are rigidly secured to the axle 20, they cannot slip or move out of their fixed position on the axle as they press against, drive and carry the bottles around the rotational path of the rotating spoke assembly.

I claim:

1. An adjustable rotor machine comprising rotor means for rotation in a rotational path, object carrying means for carrying an object in said rotational path, said carrying means including first bearing surface means for contacting one side of said object and second bearing surface means for contacting the opposite side of said object as it is carried in said rotational path, said first and second bearing surface means being positioned for spacing apart an adjustable distance for receiving therebetween objects of differing cross-sectional dimensions, and adjustment means for adjusting said distance between said first bearing surface means and said second bearing surface means, said adjustment means including said first bearing surface means rigidly held from movement toward and away from said second bearing surface means and said second bearing surface means movably mounted for movement toward and away from said first bearing surface means.

2. An adjustable rotor machine as set forth in claim 1, wherein said rotor means includes a rotational spoke assembly.

3. An adjustable rotor machine as set forth in claim 2, wherein said rotational spoke assembly comprises a support frame, an axle mounted for rotation on said support frame, and a plurality of fixed spokes affixed to said axle and extending radially therefrom.

4. An adjustable rotor machine as set forth in claim 3, including a bottle processing machine, said bottle processing machine including said rotational spoke assembly.

5. An adjustable rotor machine as set forth in claim 3, wherein each of said plurality of fixed spokes include a fixed spoke connected end secured to said axle and a fixed spoke free end spaced apart radially from said axle, said first bearing surface means including said plurality of fixed spokes.

6. An adjustable rotor machine as set forth in claim 5, wherein each of said plurality of fixed spokes include a first fixed spoke object contact member affixed thereto at said fixed spoke free end.

7. An adjustable rotor machine comprising rotor means for rotation in a rotational path, object carrying means for carrying an object in said rotational path, said carrying means including first bearing surface means for contacting one side of said object and second bearing surface means for contacting the opposite side of said object as it is carried in said rotational path, said first and second bearing surface means being positioned for spacing apart an adjustable distance for receiving therebetween objects of differing cross-sectional dimensions, and adjustment means for adjusting said distance between said first bearing surface means and said second bearing surface means, wherein said rotor means includes a rotational spoke assembly, wherein said rotational spoke assembly comprises a support frame, an axle mounted for rotation on said support frame, and a plurality of fixed spokes affixed to said axle and extending radially therefrom, wherein each of said plurality of fixed spokes include a fixed spoke connected end secured to said axle and a fixed spoke free end spaced apart radially from said axle, wherein each of said plurality of fixed spokes include a first fixed spoke object contact member affixed thereto at said fixed spoke free end, wherein each of said plurality of fixed spokes include a second fixed spoke object contact member affixed thereto at a location upwardly of said first fixed spoke object contact member.

8. An adjustable rotor machine as set forth in claim 6, wherein said carrying means includes said plurality of fixed spokes, said first bearing surface means for contacting one side of said object includes said first fixed spoke object contact member.

9. An adjustable rotor machine as set forth in claim 6, wherein said carrying means includes said plurality of fixed spokes, said first bearing surface means for contacting one side of said object includes said first fixed spoke object contact member and said second fixed spoke object contact member.

10. An adjustable rotor machine as set forth in claim 9, wherein said plurality of fixed spokes include a first fixed spoke and a second fixed spoke arcuately spaced apart from said first fixed spoke, said first fixed spoke having a side facing toward said second fixed spoke, said carrying means includes a first adjustable spoke adjacent said first fixed spoke mounted for adjustable movement away from said first fixed spoke on said side facing toward said second fixed spoke, said first adjustable spoke having an adjustable spoke free end, said second bearing surface means for contacting one side of said object comprises a first adjustable spoke object contact member, said second bearing surface means includes said first adjustable spoke object contact member, said first adjustable spoke object contact member being affixed to said first adjustable spoke at said adjustable spoke free end, said adjustment means for adjusting said distance between said first bearing surface means and said second bearing surface means including said first adjustable spoke.

11. An adjustable rotor machine as set forth in claim 10, wherein said first adjustable spoke includes a second adjustable spoke object contact member, said second adjustable spoke object contact member being affixed thereto at a location upwardly of said first adjustable spoke object contact member, said second bearing surface means includes said second adjustable spoke object contact member.

12. An adjustable rotor machine as set forth in claim 11, wherein said first adjustable spoke object contact member includes a reception cavity, said first fixed spoke object contact member includes an insert portion, said insert portion of said first fixed spoke object contact member being receivable in said reception cavity of said first adjustable spoke object contact member when said first adjustable spoke is adjustably moved to its full extent in the direction toward said first fixed spoke.

13. An adjustable rotor machine as set forth in claim 12, wherein said second adjustable spoke object contact member includes a reception cavity, said second fixed spoke object contact member includes an insert portion, said insert portion of said second fixed spoke object contact member being receivable in said reception cavity of said second adjustable spoke object contact member when said first adjustable spoke is adjustably moved to its full extent in the direction toward said first fixed spoke.

14. An adjustable rotor machine as set forth in claim 10, wherein said adjustment means for adjusting said distance between said first bearing surface means and said second bearing surface means comprises a support member mounted for arcuate movement relative to said plurality of fixed spokes, said first adjustable spoke being secured to said support member and moveable arcuately therewith relative to said first fixed spoke of said plurality of fixed spokes.

15. An adjustable rotor machine as set forth in claim 13, wherein said support member comprises a plate member having a central axis positioned in axial alignment with the central axis of said axle, a first arcuate slot in said plate member whose axis is coaxial with said central axis of said plate member, a releasable fastening member movable between a fastened together position in which said plate member cannot move relative to said plurality of fixed spokes and a released position in which said plate member can move relative to said plurality of fixed spokes, said releasable fastening member extending through said first arcuate slot and releasably connected to a one of said fixed spokes to hold said support plate against movement relative to said fixed spoke when in said fastened together position and to allow adjustable movement of said support plate and said adjustable spoke connected thereto relative to said fixed spoke when in said released position.

16. An adjustable rotor machine as set forth in claim 10, including a plurality of additional adjustable spokes, each of said fixed spokes in said plurality of fixed spokes having one of said adjustable spokes in said plurality of adjustable spokes adjacent thereto for adjustable movement relative thereto, each fixed spoke and its adjacent adjustable spoke comprising an adjustable spoke assembly, the distance between each of said adjustable spoke assemblies being adjustable to receive and hold therebetween objects of different cross-sectional dimensions by adjustably moving each of said adjustable spokes relative to their respective adjacent fixed spokes.

17. An adjustable rotor machine as set forth in claim 16, wherein said fixed spoke object contact members are positioned to face in the direction of rotation of said rotational spoke assembly to thereby bear against said objects held between respective ones of said adjustable spoke assemblies, said adjustable spoke object contact members are positioned to face in the opposite direction of rotation.

18. An adjustable rotor machine as set forth in claim 17, wherein said first fixed spoke object contact member comprises an insert portion, said insert portion having a bottom end wall which extends outwardly beyond the said fixed spoke free end of the fixed spoke on which it is affixed, an upper end wall spaced apart upwardly from said bottom end wall, a first side wall facing in the direction toward said fixed spokes to which its affixed, a groove in said first side wall to receive the facing portion of said fixed spoke to which it is affixed therein, a second side wall of said insert portion facing in the opposite direction from that in which said first side wall is facing, a third side wall facing in the direction toward which said adjustable spoke of said adjustable spoke assemblies is movable away from said fixed spoke thereof, said first fixed spoke object contact member having an integrally formed object contact portion extending from said insert portion in the direction away from that in which said adjustable spoke of said adjustable spoke assemblies is moveable away from said fixed spoke thereof.

19. An adjustable rotor machine as set forth in claim 18, wherein said integrally formed object contact portion includes a first abutment wall extending outwardly from and normal to said second side wall of said insert portion.

20. An adjustable rotor machine as set forth in claim 19, wherein said first abutment wall extends longitudinally of and substantially parallel to said fixed spoke to which said first fixed spoke object contact member is affixed from said bottom wall of said insert portion to said upper end wall thereof.

21. An adjustable rotor machine as set forth in claim 20, wherein said object contact portion of said first fixed spoke object contact member includes a second abutment wall, said second abutment wall extending outwardly from and substantially normal to said first side wall of said insert portion.

22. An adjustable rotor machine as set forth in claim 21, wherein said second abutment wall extends longitudinally of and substantially parallel to said fixed spoke to which said first fixed spoke object contact member is affixed from said bottom wall of said insert portion toward said upper end wall thereof, terminating short of said upper end wall.

23. An adjustable rotor machine as set forth in claim 22, wherein said object contact portion of said first fixed spoke object contact member includes a first trapezoidal side wall extending from and normal to said first abutment wall in the direction away from that in which said adjustable spoke is movable away from said fixed spoke, said first trapezoidal side wall includes a straight side edge substantially parallel to said fixed spoke to which said first fixed spoke object contact member is affixed and an opposite diagonally extending side edge converging inwardly toward said side edge substantially parallel to said fixed spoke as it extends upwardly in the direction toward said upper wall of said insert portion.

24. An adjustable rotor machine as set forth in claim 23, wherein said object contact portion of said first fixed spoke object contact member includes a second trapezoidal side wall, said second trapezoidal side wall extends from the outer edge of said second abutment wall along a straight side edge substantially parallel to said fixed spoke to which said first fixed spoke object contact member is affixed, extending normal to said second abutment wall in the direction away from that in which said adjustable spoke is movable away from said fixed spoke, said second trapezoidal side wall includes an opposite diagonally extending side edge converging inwardly toward said side edge substantially parallel to said fixed spoke as it extends upwardly in the direction toward said upper wall of said insert portion.

25. An adjustable rotor machine as set forth in claim 24, wherein said object contact portion of said first fixed spoke object contact member includes a diagonally extending object contact side wall extending upwardly from said bottom end wall of said insert portion to said upper end wall thereof and between said first and second trapezoidal side walls.

26. An adjustable rotor machine as set forth in claim 25, wherein said second fixed spoke object contact member is affixed to said fixed spoke at a location spaced apart from and above said first fixed spoke object contact member, said second fixed spoke object contact member includes an insert portion, said insert portion thereof having a bottom end wall, an upper end wall, a first side wall facing in the direction toward said fixed spoke, and a groove in said first side wall to receive the facing portion of said fixed spoke therein.

27. An adjustable rotor machine as set forth in claim 26, wherein said insert portion of said second fixed spoke object contact member includes a second side wall opposite from said first side wall, a third side wall facing in the direction toward which said ajustable spoke is movable away from said fixed spoke, and an object contact portion integrally formed with said insert portion and extending outwardly therefrom on the side opposite rom said third side wall.

28. An adjustable rotor machine as set forth in claim 27, wherein said object contact portion of said second fixed spoke object contact member includes a first abutment wall extending outwardly from and substantially normal to said second side wall of said insert portion of said second fixed spoke object contact member, said first abutment wall extending upwardly from said bottom end wall of said insert portion of said second fixed spoke object contact member to said upper end wall thereof.

29. An adjustable rotor machine as set forth in claim 28, wherein said object contact portion of said second fixed spoke object contact member includes a trapezoidal side wall extending from and normal to said first abutment wall of said insert portion of said second fixed spoke object contact member along a straight edge coincident with the outer edge of said first abutment wall and substantially parallel to said fixed spoke, said trapezoidal side wall of said object contact portion of said second fixed spoke object contact member having an opposite diagonally extending side edge converging inwardly toward said opposite straight edge that is substantially parallel to said fixed spoke as it extends upwardly from said bottom end wall to said upper end wall of said insert portion of said second fixed spoke object contact member.

30. An adjustable rotor machine as set forth in claim 29, wherein said object contact portion of said second fixed spoke object contact member includes a second trapezoidal side wall extending from said groove in said first side wall of said insert portion of said second fixed spoke object contact member in the direction away from that in which the said adjustable spoke is movable away from said fixed spoke, terminating in a diagonally extending side edge which converges inwardly as it extends upwardly from said bottom end wall to said upper end wall of said insert portion of said second fixed spoke object contact member.

31. An adjustable rotor machine as set forth in claim 30, wherein said object contact portion of said second fixed spoke object contact member includes a diagonally extending object contact side wall extending from the outer edge of said first trapezoidal side wall of said insert portion of said second fixed spoke object contact member to the said diagonally extending side edge of said second trapezoidal side wall of said second fixed spoke object contact member, said diagonally extending object contact side wall thereof converging inwardly as it extends upwardly from said bottom end wall of said second fixed spoke object contact member to said upper end wall thereof.

32. An adjustable rotor machine as set forth in claim 31, wherein said first adjustable spoke object contact member affixed to said adjustable spoke at said adjustable spoke free end includes said cavity to receive said insert portion of said first fixed spoke object contact member when said adjustable spoke is moved to its fullest extent toward said fixed spoke, said first adjustable spoke object contact member includes a lower end wall extending below said adjustable spoke free end, an upper end wall spaced apart upwardly from said lower end wall, a first side wall having an inner surface facing said cavity, a groove in said inner surface to receive the facing portion of said adjustable spoke therein, said first side wall of said first adjustable spoke object contact member having an outer surface, said outer surface thereof having converging opposite side edges which converge inwardly as they extend upwardly.

33. An adjustable rotor machine as set forth in claim 32, wherein said first adjustable spoke object contact member includes a second side wall spaced apart below said first side wall thereof, an object contact wall of said first adjustable spoke object contact member extending laterally of said first and second side walls thereof and extending diagonally in the upward direction converging inwardly as it extends upwardly, said second side wall extending from said object contact wall to terminate at a first abutment wall of said first adjustable spoke object contact member to abut against said second abutment wall of said object contact portion of said first fixed spoke object contact member when said insert portion thereof has been fully received in said cavity of said first adjustable spoke object contact member.

34. An adjustable rotor machine as set forth in claim 33, wherein said first adjustable spoke object contact member includes a third side wall on the opposite side of said cavity, said third side wall extending from said diagonally extending object contact wall in a direction substantially normal thereto to terminate in an elongated abutment edge for abutment against said first abutment wall of said object contact portion of said first fixed spoke object contact member when said insert portion thereof has been fully received in said cavity of said first adjustable spoke object contact member.

35. An adjustable rotor machine as set forth in claim 34, wherein said second adjustable spoke object contact member is affixed to said adjustable spoke above said first adjustable spoke object contact member, said second adjustable spoke object contact member including a cavity to receive said insert portion of said second fixed spoke object contact member, a first side wall having an inner surface facing said cavity, a groove in said inner surface to receive the facing portion of said adjustable spoke, said first side wall having opposite diagonal side edges converging inwardly as they extend upwardly.

36. An adjustable rotor machine as set forth in claim 35, wherein said second adjustable spoke object contact member includes a second side wall on the opposite side of said cavity, a diagonally extending object contact wall, said second side wall of said second adjustable spoke object contact member extending substantially normal to said object contact wall and terminating in a second side wall abutment edge for abutment against said abutment wall of said object contact portion of said second fixed object contact member when said insert portion thereof has been fully received in said cavity of said second adjustable spoke object contact member.

37. An adjustable rotor machine as set forth in claim 7, wherein said carrying means includes said plurality of fixed spokes, said first bearing surface means for contacting one side of said object includes said first fixed spoke object contact member and said second fixed spoke object contact member.

38. An adjustable rotor machine as set forth in claim 37, wherein said plurality of fixed spokes include a first fixed spoke and a second fixed spoke arcuately spaced apart from said first fixed spoke, said first fixed spoke having a side facing toward said second fixed spoke, said carrying means includes a first adjustable spoke adjacent said first fixed spoke mounted for adjustable movement away from said first fixed spoke on said side facing toward said second fixed spoke, said first adjustable spoke having an adjustable spoke free end, said second bearing surface means for contacting one side of said object comprises a first adjustable spoke object contact member, said second bearing surface means includes said first adjustable spoke object contact member, said first adjustable spoke object contact member being affixed to said first adjustable spoke at said adjustable spoke free end, said adjustment means for adjusting said distance between said first bearing surface means and said second bearing surface means including said first adjustable spoke.

39. An adjustable rotor machine as set forth in claim 38, wherein said first adjustable spoke includes a second adjustable spoke object contact member, said second adjustable spoke object contact member being affixed thereto at a location upwardly of said first adjustable spoke object contact member, said second bearing surface means includes said second adjustable spoke object contact member.

40. An adjustable rotor machine as set forth in claim 39, wherein said first adjustable spoke object contact member includes a reception cavity, said first fixed spoke object contact member includes an insert portion, said insert portion of said first fixed spoke object contact member being receivable in said reception cavity of said first adjustable spoke object contact member when said first adjustable spoke is adjustably moved to its full extent in the direction toward said first fixed spoke.

41. An adjustable rotor machine as set forth in claim 40, wherein said second adjustable spoke object contact member includes a reception cavity, said second fixed spoke object contact member includes an insert portion, said insert portion of said second fixed spoke object contact member being receivable in said reception cavity of said second adjustable spoke object contact member when said first adjustable spoke is adjustably moved to its full extent in the direction toward said first fixed spoke.

42. An adjustable rotor machine as set forth in claim 38, wherein said adjustment means for adjusting said distance between said first bearing surface means and said second bearing surface means comprises a support member mounted for arcuate movement relative to said plurality of fixed spokes, said first adjustable spoke being secured to said support member and moveable arcuately therewith relative to said first fixed spoke of said plurality of fixed spokes.

43. An adjustable rotor machine as set forth in claim 42, wherein said support member comprises a plate member having a central axis positioned in axial alignment with the central axis of said axle, a first arcuate slot in said plate member whose axis is coaxial with said central axis of said plate member, a releasable fastening member movable between a fastened together position in which said plate member cannot move relative to said plurality of fixed spokes and a released position in which said plate member can move relative to said plurality of fixed spokes, said releasable fastening member extending through said first arcuate slot and releasably connected to a one of said fixed spokes to hold said support plate against movement relative to said fixed spoke when in said fastened together position and to allow adjustable movement of said support plate and said adjustable spoke connected thereto relative to said fixed spoke when in said released position.

44. An adjustable rotor machine as set forth in claim 38, including a plurality of additional adjustable spokes, each of said fixed spokes in said plurality of fixed spokes having one of said adjustable spokes in said plurality of adjustable spokes adjacent thereto for adjustable movement relative thereto, each fixed spoke and its adjacent adjustable spoke comprising an adjustable spoke assembly, the distance between each of said adjustable spoke assemblies being adjustable to receive and hold therebetween objects of different cross-sectional dimensions by adjustably moving each of said adjustable spokes relative to their respective adjacent fixed spokes.

45. An adjustable rotor machine as set forth in claim 44, wherein said fixed spoke object contact members are positioned to face in the direction of rotation of said rotational spoke assembly to thereby bear against said objects held between respective ones of said adjustable spoke assemblies, said adjustable spoke object contact members are positioned to face in the opposite direction of rotation.

46. An adjustable rotor machine as set forth in claim 45, wherein said first fixed spoke object contact member comprises an insert portion, said insert portion having a bottom end wall which extends outwardly beyond the said fixed spoke free end of the fixed spoke on which it is affixed, an upper end wall spaced apart upwardly from said bottom end wall, a first side wall facing in the direction toward said fixed spokes to which its affixed, a groove in said first side wall to receive the facing portion of said fixed spoke to which it is affixed therein, a second side wall of said insert portion facing in the opposite direction from that in which said first side wall is facing, a third side wall facing in the direction toward which said adjustable spoke of said adjustable spoke assemblies is movable away from said fixed spoke thereof, said first fixed spoke object contact member having an integrally formed object contact portion extending from said insert portion in the direction away from that in which said adjustable spoke of said adjustable spoke assemblies is moveable away from said fixed spoke thereof.

47. An adjustable rotor machine as set forth in claim 46, wherein said integrally formed object contact portion includes a first abutment wall extending outwardly from and normal to said second side wall of said insert portion.

48. An adjustable rotor machine as set forth in claim 47, wherein said first abutment wall extends longitudinally of and substantially parallel to said fixed spoke to which said first fixed spoke object contact member is affixed from said bottom wall of said insert portion to said upper end wall thereof.

49. An adjustable rotor machine as set forth in claim 48, wherein said object contact portion of said first fixed spoke object contact member includes a second abutment wall, said second abutment wall extending outwardly from and substantially normal to said first side wall of said insert portion.

50. An adjustable rotor machine as set forth in claim 49, wherein said second abutment wall extends longitudinally of and substantially parallel to said fixed spoke to which said first fixed spoke object contact member is affixed from said bottom wall of said insert portion toward said upper end wall thereof, terminating short of said upper end wall.

51. An adjustable rotor machine as set forth in claim 22, wherein said object contact portion of said first fixed spoke object contact member includes a first trapezoidal side wall extending from and normal to said first abutment wall in the direction away from that in which said adjustable spoke is movable away from said fixed spoke, said first trapezoidal side wall includes a straight side edge substantially parallel to said fixed spoke to which said first fixed spoke object contact member is affixed and an opposite diagonally extending side edge converging inwardly toward said side edge substantially parallel to said fixed spoke as it extends upwardly in the direction toward said upper wall of said insert portion.

52. An adjustable rotor machine as set forth in claim 51, wherein said object contact portion of said first fixed spoke object contact member includes a second trapezoidal side wall, said second trapezoidal side wall extends from the outer edge of said second abutment wall along a straight side edge substantially parallel to said fixed spoke to which said first fixed spoke object contact member is affixed, extending normal to said second abutment wall in the direction away from that in which said adjustable spoke is movable away from said fixed spoke, said second trapezoidal side wall includes an opposite diagonally extending side edge converging inwardly toward said side edge substantially parallel to said fixed spoke as it extends upwardly in the direction toward said upper wall of said insert portion.

53. An adjustable rotor machine as set forth in claim 52, wherein said object contact portion of said first fixed spoke object contact member includes a diagonally extending object contact side wall extending upwardly from said bottom end wall of said insert portion to said upper end wall thereof and between said first and second trapezoidal side walls.

54. An adjustable rotor machine as set forth in claim 25, wherein said second fixed spoke object contact member is affixed to said fixed spoke at a location spaced apart from and above said first fixed spoke object contact member, said second fixed spoke object contact member includes an insert portion, said insert portion thereof having a bottom end wall, an upper end wall, a first side wall facing in the direction toward said fixed spoke, and a groove in said first side wall to receive the facing portion of said fixed spoke therein.

55. An adjustable rotor machine as set forth in claim 54, wherein said insert portion of said second fixed spoke object contact member includes a second side wall opposite from said first side wall, a third side wall facing in the direction toward which said ajustable spoke is movable away from said fixed spoke, and an object contact portion integrally formed with said insert portion and extending outwardly therefrom on the side opposite rom said third side wall.

56. An adjustable rotor machine as set forth in claim 55, wherein said object contact portion of said second fixed spoke object contact member includes a first abutment wall extending outwardly from and substantially normal to said second side wall of said insert portion of said second fixed spoke object contact member, said first abutment wall extending upwardly from said bottom end wall of said insert portion of said second fixed spoke object contact member to said upper end wall thereof.

57. An adjustable rotor machine as set forth in claim 56, wherein said object contact portion of said second fixed spoke object contact member includes a trapezoidal side wall extending from and normal to said first abutment wall of said insert portion of said second fixed spoke object contact member along a straight edge coincident with the outer edge of said first abutment wall and substantially parallel to said fixed spoke, said trapezoidal side wall of said object contact portion of said second fixed spoke object contact member having an opposite diagonally extending side edge converging inwardly toward said opposite straight edge that is substantially parallel to said fixed spoke as it extends upwardly from said bottom end wall to said upper end wall of said insert portion of said second fixed spoke object contact member.

58. An adjustable rotor machine as set forth in claim 57, wherein said object contact portion of said second fixed spoke object contact member includes a second trapezoidal side wall extending from said groove in said first side wall of said insert portion of said second fixed spoke object contact member in the direction away from that in which the said adjustable spoke is movable away from said fixed spoke, terminating in a diagonally extending side edge which converges inwardly as it extends upwardly from said bottom end wall to said upper end wall of said insert portion of said second fixed spoke object contact member.

59. An adjustable rotor machine as set forth in claim 58, wherein said object contact portion of said second fixed spoke object contact member includes a diagonally extending object contact side wall extending from the outer edge of said first trapezoidal side wall of said insert portion of said second fixed spoke object contact member to the said diagonally extending side edge of said second trapezoidal side wall of said second fixed spoke object contact member, said diagonally extending object contact side wall thereof converging inwardly as it extends upwardly from said bottom end wall of said second fixed spoke object contact member to said upper end wall thereof.

60. An adjustable rotor machine as set forth in claim 59, wherein said first adjustable spoke object contact member affixed to said adjustable spoke at said adjustable spoke free end includes said cavity to receive said insert portion of said first fixed spoke object contact member when said adjustable spoke is moved to its fullest extent toward said fixed spoke, said first adjustable spoke object contact member includes a lower end wall extending below said adjustable spoke free end, an upper end wall spaced apart upwardly from said lower end wall, a first side wall having an inner surface facing said cavity, a groove in said inner surface to receive the facing portion of said adjustable spoke therein, said first side wall of said first adjustable spoke object contact member having an outer surface, said outer surface thereof having converging opposite side edges which converge inwardly as they extend upwardly.

61. An adjustable rotor machine as set forth in claim 30, wherein said first adjustable spoke object contact member includes a second side wall spaced apart below said first side wall thereof, an object contact wall of said first adjustable spoke object contact member extending laterally of said first and second side walls thereof and extending diagonally in the upward direction converging inwardly as it extends upwardly, said second side wall extending from said object contact wall to terminate at a first abutment wall of said first adjustable spoke object contact member to abut against said second abutment wall of said object contact portion of said first fixed spoke object contact member when said insert portion thereof has been fully received in said cavity of said first adjustable spoke object contact member.

62. An adjustable rotor machine as set forth in claim 61, wherein said first adjustable spoke object contact member includes a third side wall on the opposite side of said cavity, said third side wall extending from said diagonally extending object contact wall in a direction substantially normal thereto to terminate in an elongated abutment edge for abutment against said first abutment wall of said object contact portion of said first fixed spoke object contact member when said insert portion thereof has been fully received in said cavity of said first adjustable spoke object contact member.

63. An adjustable rotor machine as set forth in claim 62, wherein said second adjustable spoke object contact member is affixed to said adjustable spoke above said first adjustable spoke object contact member, said second adjustable spoke object contact member including a cavity to receive said insert portion of said second fixed spoke object contact member, a first side wall having an inner surface facing said cavity, a groove in said inner surface to receive the facing portion of said adjustable spoke, said first side wall having opposite diagonal side edges converging inwardly as they extend upwardly.

64. An adjustable rotor machine as set forth in claim 63, wherein said second adjustable spoke object contact member includes a second side wall on the opposite side of said cavity, a diagonally extending object contact wall, said second side wall of said second adjustable spoke object contact member extending substantially normal to said object contact wall and terminating in a second side wall abutment edge for abutment against said abutment wall of said object contact portion of said second fixed object contact member when said insert portion thereof has been fully received in said cavity of said second adjustable spoke object contact member.

\* \* \* \* \*